(12) United States Patent
Abdul Jabbar

(10) Patent No.: US 11,855,252 B2
(45) Date of Patent: Dec. 26, 2023

(54) MULTIMODAL ELECTROLYTE DESIGN FOR ALL SOLID STATE BATTERIES

(71) Applicant: Nissan North America, Inc., Franklin, TN (US)

(72) Inventor: Mohammed Hussain Abdul Jabbar, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 1244 days.

(21) Appl. No.: 16/427,525

(22) Filed: May 31, 2019

(65) Prior Publication Data

US 2020/0381768 A1  Dec. 3, 2020

(51) Int. Cl.
*H01M 10/056* (2010.01)

(52) U.S. Cl.
CPC .. *H01M 10/056* (2013.01); *H01M 2300/0071* (2013.01); *H01M 2300/0082* (2013.01); *H01M 2300/0094* (2013.01)

(58) Field of Classification Search
CPC ....... H01M 10/056; H01M 2300/0068; H01M 2300/0071; H01M 4/382; H01M 4/525; H01M 4/62; Y02E 60/10
See application file for complete search history.

(56) References Cited

U.S. PATENT DOCUMENTS

| | | | |
|---|---|---|---|
| 5,273,837 A | 12/1993 | Aitken et al. | |
| 5,286,322 A * | 2/1994 | Armstrong | C04B 35/64 |
| | | | 264/618 |
| 2012/0002359 A1 * | 1/2012 | Sanada | H01M 4/0407 |
| | | | 361/679.01 |
| 2014/0099539 A1 * | 4/2014 | Yamazaki | H01M 4/366 |
| | | | 423/325 |
| 2017/0139013 A1 * | 5/2017 | Richards | H01M 10/0562 |
| 2018/0138557 A1 * | 5/2018 | Jeong | H01M 4/505 |

FOREIGN PATENT DOCUMENTS

| | | |
|---|---|---|
| CA | 2983601 A1 | 1/2017 |
| JP | 2002329511 A | 11/2002 |
| JP | 2013206654 A | 10/2013 |
| WO | 2007030106 A1 | 3/2007 |
| WO | 2008033827 A1 | 3/2008 |
| WO | 2012053359 A1 | 4/2012 |
| WO | 2013119295 A1 | 8/2013 |

* cited by examiner

*Primary Examiner* — Brian R Ohara
*Assistant Examiner* — Patrick Marshall Greene
(74) *Attorney, Agent, or Firm* — Young Basile Hanlon & MacFarlane, P.C.

(57) ABSTRACT

A multimodal solid electrolyte for a solid-state lithium electrochemical device comprises a first layer formed of first rows each having an anode-facing base with an apex extending opposite an anode, the first layer being a first inorganic lithium conducting oxide material, and a second layer formed of second rows each having a cathode-facing base with an apex extending opposite a cathode, the second layer being a second inorganic lithium conducting oxide material, wherein the second rows are offset from the first rows such that the apex of each second row nests within the first rows. A solid polymer electrolyte layer is sandwiched between the first layer and the second layer.

20 Claims, 5 Drawing Sheets

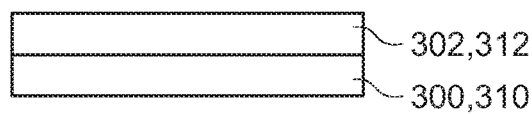
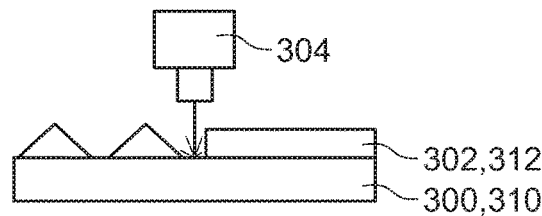
FIG. 7A  FIG. 7B
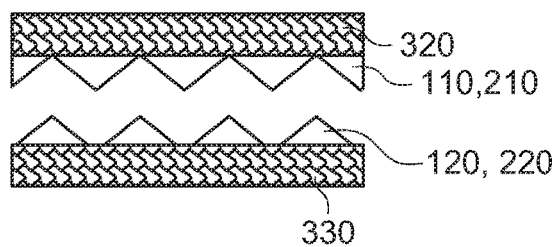
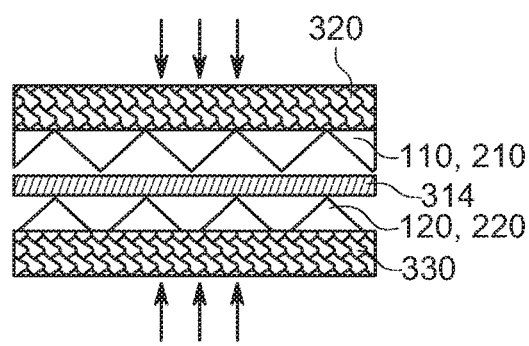
FIG. 7C  FIG. 7D
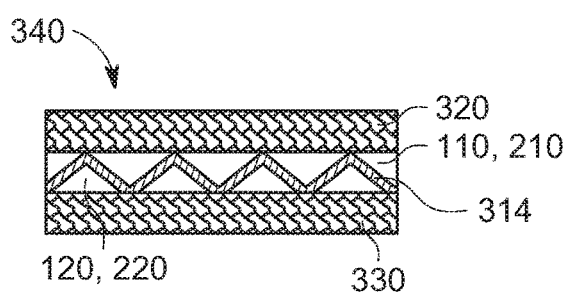
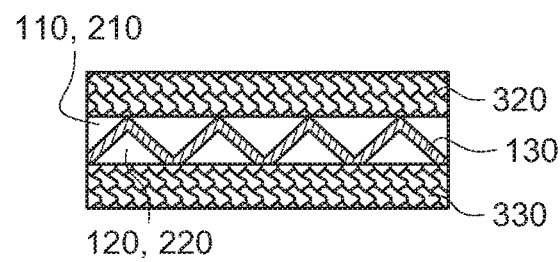
FIG. 7E  FIG. 7F

MULTIMODAL ELECTROLYTE DESIGN FOR ALL SOLID STATE BATTERIES

TECHNICAL FIELD

This disclosure relates to a multimodal solid electrolyte design for use in solid-state batteries.

BACKGROUND

All solid-state lithium batteries can produce high volumetric and gravimetric energy densities. Solid-state lithium batteries have other advantages over conventional non-solid-state lithium-ion batteries, such as improved safety, operation over a wider temperature range and higher charge/discharge cycling rates. In particular, ceramic oxides/inorganic oxides-based electrolytes have higher lithium ion conductivity than polymer electrolytes. However, all solid-state lithium batteries made of ceramic oxides can still suffer from electric shorts under rigorous cycle conditions as materials such as garnet diffuse metallic lithium forming dendrites through grain boundaries. Using materials that diffuse lithium metal comparatively less, such as solid polymers, increase the ionic resistance and decrease the overall battery performance, however, still has the advantage of easy manufacturing and application without high temperature sintering. Improvements in electrolyte conductivity are desired for all solid-state lithium batteries to achieve high performance and longevity, for example.

SUMMARY

Disclosed herein are implementations of a multimodal solid electrolyte for a solid-state lithium electrochemical device such as a battery. The multimodal solid electrolyte comprises a first layer formed of first rows each having an anode-facing base with an apex extending opposite an anode, the first layer being a first inorganic lithium conducting oxide material, and a second layer formed of second rows each having a cathode-facing base with an apex extending opposite a cathode, the second layer being a second inorganic lithium conducting oxide material, wherein the second rows are offset from the first rows such that the apex of each second row nests within the first rows. A solid polymer electrolyte layer is sandwiched between the first layer and the second layer.

Also disclosed herein are solid-state lithium electrochemical devices. One implementation comprises an anode comprising a porous anode support on which anode active material is supported; a cathode comprising a porous cathode support on which cathode active material is supported; and a multi-layer electrolyte. The multimodal electrolyte comprise a first layer formed of first rows each having a base in contact with the anode with an apex extending opposite the anode, and a second layer formed of second rows each having a base in contact with the cathode and an apex extending opposite the cathode, wherein the second rows are offset from the first rows such that the apex of each second row nests within the first rows. A solid polymer electrolyte layer is sandwiched between the first layer and the second layer. The first layer and the second layer are each greater than 98% dense and the porous anode support and the porous cathode support are between 30% and 60% porous.

In some implementations, the first layer is formed of first continuous projections. The second layer is also formed of second continuous projections similar to the first continuous projections but will be offset from the first continuous projections so that the first layer can be nested in the second layer or vice versa, with the solid polymer electrolyte layer sandwiched between the first layer and the second layer.

In some embodiments, the first layer is formed of first rows of first cones. The second layer is also formed of second cones similar to the first cones but will be offset from the first cones so that the first layer can be nested in the second layer or vice versa, with the solid polymer electrolyte layer sandwiched between the first layer and the second layer.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 7A-7F are schematics of a method of making the embodiments of the all solid-state electrochemical devices disclosed herein.

DETAILED DESCRIPTION

Solid electrolytes tend to be of a material that is mechanically strong but that diffuses metallic lithium through grain boundaries, resulting in electric shorts when cycled. Some solid electrolytes are of a material that does not diffuse lithium metal but is much weaker mechanically, resulting in failures due to vibrations, for example.

Disclosed herein are multimodal solid electrolytes having more than one phase to address the issues with lithium metal diffusion and weakness. The multimodal solid electrolytes create a mechanically robust, durable, high performance solid-state battery. The disclosed multimodal solid electrolytes double the surface area of the electrolyte phases. The phases are lithium ion conducting and work together to restrict the diffusion of metallic lithium while mechanically strengthening the electrode. Internal resistance is reduced due to the material used in the multimodal solid electrolyte.

Figure 1:
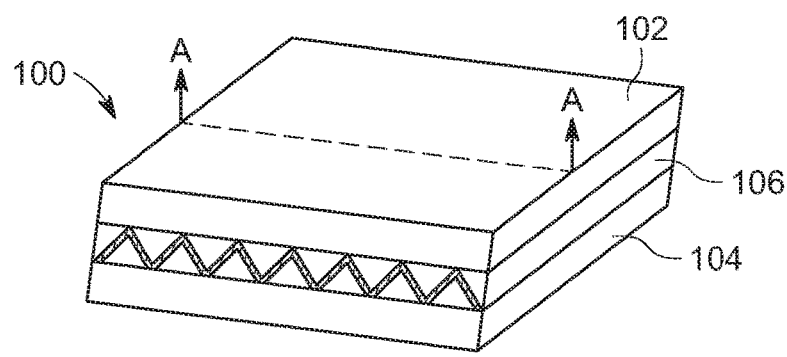
FIG. 1 is a perspective view of an embodiment of an all solid-state electrochemical cell.

FIG. 1 is a perspective view of an embodiment of a solid-state electrochemical cell 100 comprising an anode 102, a cathode 104, and a multimodal solid electrolyte layer 106.

Figure 2:
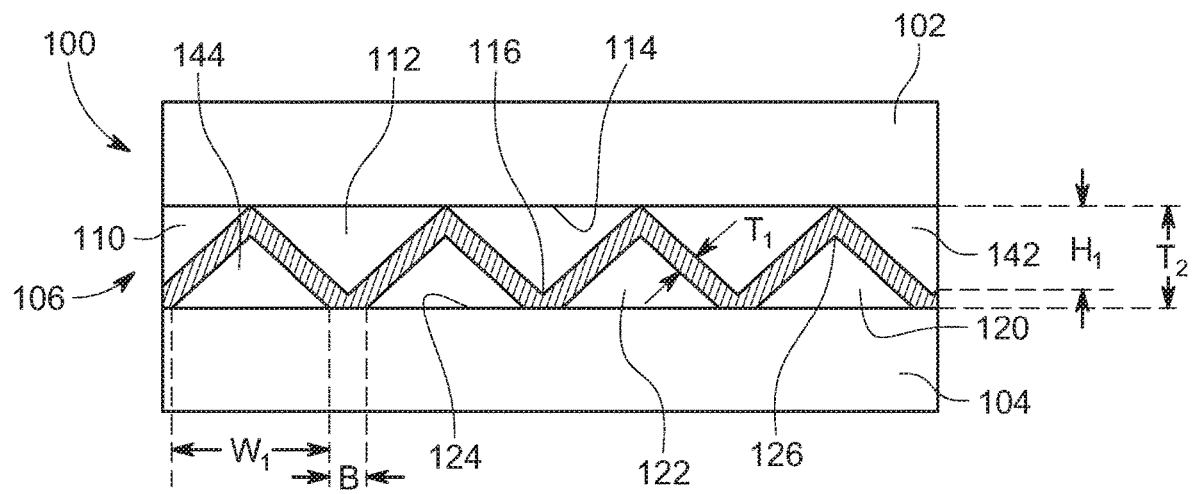
FIG. 2 is a cross-sectional view if FIG. 1 along line A.

FIG. 2 is a cross-sectional view along line A of the solid-state lithium electrochemical cell 100 of FIG. 1, enlarging the multimodal solid electrolyte layer 106. The multimodal solid electrolyte layer 106 includes a first layer 110 formed of first rows 112, with each row 112 having a base 114 in contact with the anode 102 and having an apex 116 extending opposite the anode 102. A second layer 120 is formed of second rows 122, each row 122 having a base 124 in contact with the cathode 104 and an apex 126 extending opposite the cathode 104. The second rows 122 are offset from the first rows 112 such that the apex 126 of each second row 122 nests within the first rows 112. A solid polymer electrolyte layer 130 is sandwiched between the first layer 110 and the second layer 120.

Figure 3:
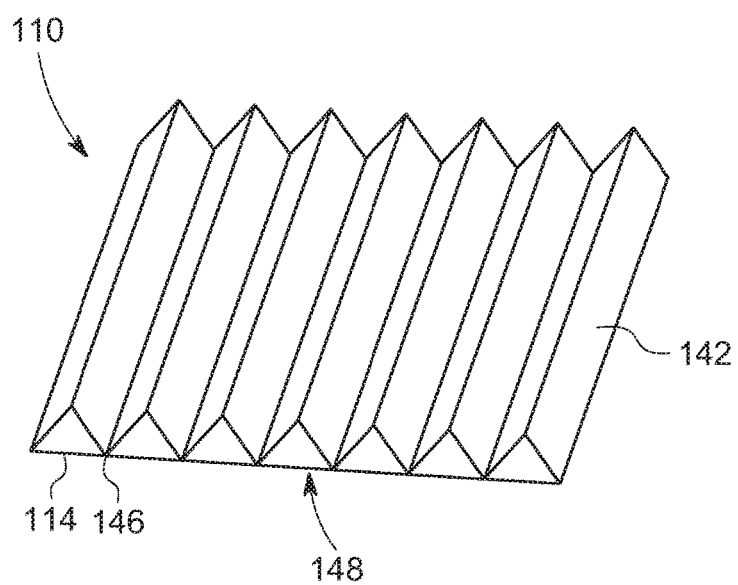
FIG. 3 is a perspective view of an embodiment of a first layer of a multi-modal solid electrolyte.

In the embodiment shown in FIG. 1, the first layer 110 (shown upside down in FIG. 3) is formed of first continuous projections 142. The second layer 120 is also formed of second continuous projections 144 similar to the first continuous projections 142 illustrated in FIG. 3 but will be offset from the first continuous projections 142 so that the first layer 110 can be nested in the second layer 120 or vice versa, with the solid polymer electrolyte layer 130 sandwiched between the first layer 110 and the second layer 120 as illustrated in FIGS. 1 and 2.

An edge 146 or perimeter of each anode-facing base 114 of the first continuous projections 142 of the first layer 110 are in contact with adjacent anode-facing bases 114 of adjacent first continuous projections 142 to form a planar anode-facing surface 148. An edge or perimeter of each cathode-facing base 124 of the second continuous projections 144 of the second layer 120 is between 0 μm and 10 μm from an adjacent cathode-facing base 124 of adjacent second continuous projections 144, illustrated in FIG. 2 with B.

A width $W_1$ of each anode-facing base 114 of the first continuous projections 142 and each cathode-facing base 124 of the second continuous projections 142 is between 50 μm and 200 μm and a height Hi at the apex 116, 126 of each of the first continuous projections 142 and the second continuous projections 144 is between 10 μm and 250 μm.

The solid polymer electrolyte layer 130 has a thickness $T_1$ of between 0.1 μm and 100 μm and the multi-layer electrolyte 106 has a thickness $T_2$ of between 10 μm and 500 μm.

Figure 4:
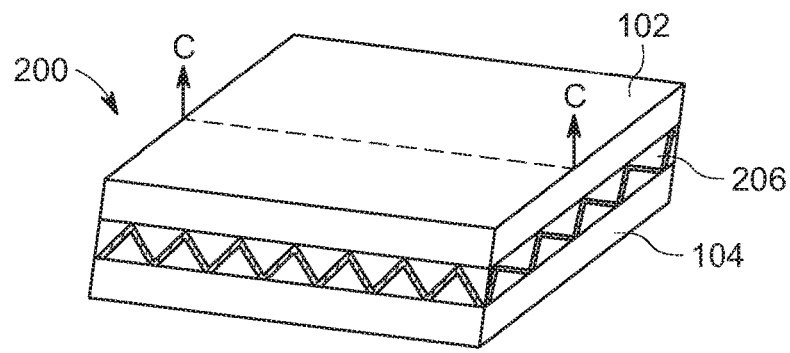
FIG. 4 is a perspective view of another embodiment of an all solid-state electrochemical cell.

FIG. 4 is a perspective view of another embodiment of a solid-state electrochemical cell 200 comprising the anode 102, the cathode 104, and a multimodal solid electrolyte layer 206.

Figure 5:
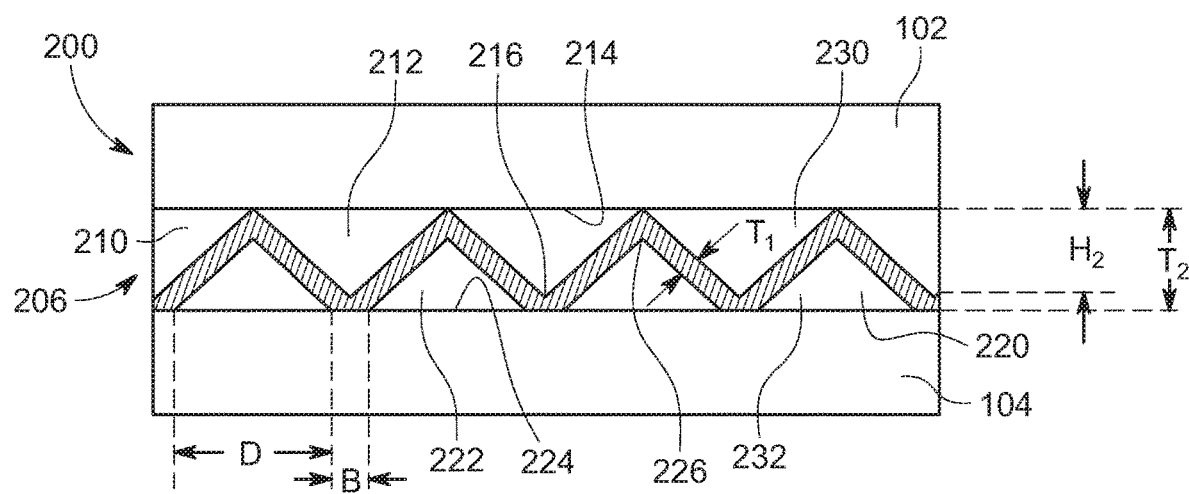
FIG. 5 is a cross-sectional view if FIG. 4 along line C.

FIG. 5 is a cross-sectional view along line C of the solid-state lithium electrochemical cell 200 of FIG. 4, enlarging the multimodal solid electrolyte layer 206. The multimodal solid electrolyte layer 206 includes a first layer 210 formed of first rows 212, with each row 212 having a base 214 in contact with the anode 102 and having an apex 216 extending opposite the anode 102. A second layer 220 is formed of second rows 222, each row 222 having a base 224 in contact with the cathode 104 and an apex 226 extending opposite the cathode 104. The second rows 222 are offset from the first rows 212 such that the apex 226 of each second row 222 nests within the first rows 212. A solid polymer electrolyte layer 130 is sandwiched between the first layer 210 and the second layer 220.

Figure 6:
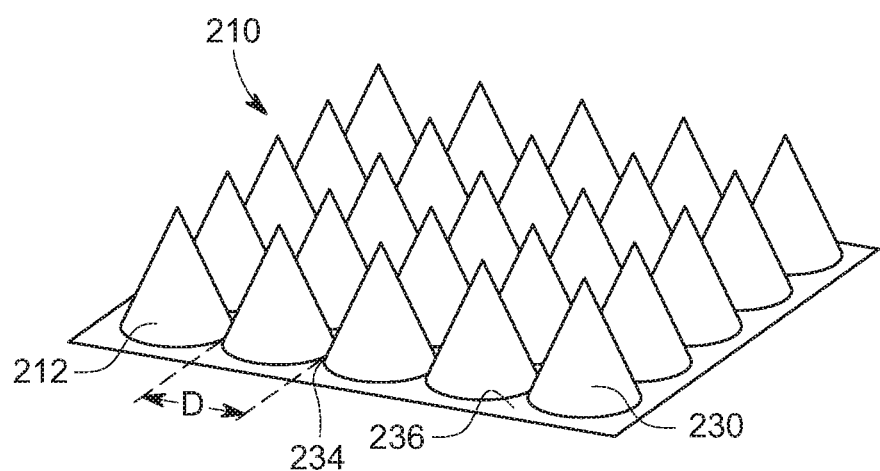
FIG. 6 is a perspective view of another embodiment of a first layer of the multi-modal solid electrolyte.

In this embodiment, the first layer 210 is formed of first rows 212 of first cones 230, the first layer 210 shown upside down in FIG. 6. The second layer 220 is also formed of second cones 232 similar to the first cones 230 illustrated in FIG. 6 but will be offset from the first cones 230 so that the first layer 210 can be nested in the second layer 220 or vice versa, with the solid polymer electrolyte layer 130 sandwiched between the first layer 210 and the second layer 220 as illustrated in FIGS. 4 and 5.

A perimeter 234 of each anode-facing base 214 of the first cones 230 of the first layer 210 are in contact with adjacent anode-facing bases 214 of adjacent first cones 230 to form a planar anode-facing surface 236. A perimeter of each cathode-facing base 224 of the second cones 232 of the second layer 220 is between 0μm and 10 μm from an adjacent cathode-facing base 224 of adjacent second cones 232, illustrated in FIG. 5 with B.

A diameter D of each anode-facing base 214 of the first cones 230 and each cathode-facing base 224 of the second cones 232 is between 50 μm and 200 μm and a height $H_2$ of each of the first cones 230 and the second cones 232 is between 10 μm and 250 μm. The solid polymer electrolyte layer 130 has a thickness $T_1$ of between 0.1 μm and 100 μm and the multi-layer electrolyte 106 has a thickness $T_2$ of between 10 μm and 500 μm.

The first layer 110, 210 and the second layer 120, 220 are each greater than 98% dense, meaning that the layers have almost no porosity, except the practical experimental errors. This density contributes to providing the ion conductivity and strength desired from the embodiments herein.

The first layer 110, 210 is a first inorganic lithium conducting oxide material and the second layer 120, 220 is a second inorganic lithium conducting oxide material. The first layer 110 can be of the same material as the second layer 210 or can be a different inorganic lithium conducting oxide material. Non-limiting examples of inorganic lithium conducting oxide materials include $Li_{10}GeP_2S_{12}$, $Li_7La_3Zr_2O_{12}$ and $La_{0.5}Li_{0.5}TiO_3$. As an example, the first inorganic lithium conducting oxide material of the first layer 110, 210 can be $Li_{10}GeP_2S_{12}$ and the second inorganic lithium conducting oxide material of the second layer 120, 220 can be one of $Li_7La_3Zr_2O_{12}$ and $La_{0.5}Li_{0.5}TiO_3$. In this example, the $Li_{10}GeP_2S_{12}$ is purposefully used on the first layer 110, 210 in contact with the anode 102 as $Li_{10}GeP_2S_{12}$ provides very high lithium ion conduction, which assists in diffusing lithium ions between electrodes. As another example, the first inorganic lithium conducting oxide material of the first layer 110, 210 can $Li_{10}GeP_2S_{12}$ and the second inorganic lithium conducting oxide material of the second layer 120, 220 can be $La_{0.5}Li_{0.5}TiO_3$. This example incorporates the high lithium ion conduction of $Li_{10}GeP_2S_{12}$ with the high mechanical strength of $La_{0.5}Li_{0.5}TiO_3$.

The solid polymer electrolyte layer 130 can be, as non-limiting examples, a poly(ethylene oxide) (PEO) based solid electrolyte with lithium salts or a poly siloxane solid electrolyte with lithium salts. This solid polymer electrolyte layer 130 is also greater than 98% dense, meaning that the layer has almost no porosity, except the practical experimental errors. This density contributes to providing the ion conductivity and strength desired from the embodiments herein.

The structure of the multi-modal solid electrolyte layers 106, 206 provides many advantages over conventional solid electrolytes. The nested, overlapping first and second layers provide excellent mechanical strength and help to hold the polymer electrolyte intact, which in turn improves durability and life. Having the different layers of solid electrolyte results in lower internal resistance and reduces the likeliness of a short in the cell. The structures of the first and second layers provide about twice the surface area than a flat layer, which improves lithium ion migration, reducing internal resistance. Both the polymer electrolyte and the inorganic oxide electrolyte are lithium ion conducting, however, the inorganic oxide may diffuse metallic lithium. The polymer electrolyte prevents lithium metal diffusion, providing a barrier aimed to eliminate shorts.

The anode 102 comprises a porous anode support and the cathode 104 comprises a porous cathode support. The porous anode support and the porous cathode support have a porosity of between 30% and 60%, inclusive. The porous anode support and the porous cathode support can each be an inorganic lithium conducting oxide material. Non-limiting examples of inorganic lithium conducting oxide materials include $Li_{10}GeP_2S_{12}$, $Li_7La_3Zr_2O_{12}$, and $La_{0.5}Li_{0.5}TiO_3$. The material is the same as that used in the multimodal solid electrolytes 106, 206; however, the density (or porosity) of the layers is significantly different. The porous anode support can be the same material or different material than the porous cathode support. The porous anode support can be the same material or different material than the first layer 110, 210 of the multimodal solid electrolyte 106, 206. The porous cathode support can be the same material or different material than the second layer 120, 220 of the multimodal solid electrolyte 106, 206. As a non-limiting example, the porous cathode support and the second layer can be $La_{0.5}Li_{0.5}TiO_3$ and the porous anode support and the first layer can be $Li_{10}GeP_2S_{12}$.

The anode 102 further comprises lithium metal as the active material. The porous anode support can be coated in an oxide such as a lithium-treated LZ material to enhance the lithium metal deposition on the porous anode support. The anode 102 will further include an anode current collector opposite the multimodal solid electrolyte layer 106, 206. The anode current collector can include copper or a copper alloy, as a non-limiting example.

The cathode 104 further comprises an active material deposited on the porous cathode support. The active material can be $Li(Ni_{0.5}Mn_{0.3}Co0.2)O2$, as a non-limiting example. The active material can be a sulfur-based composite with carbon black dispersed in solvent with a polymer (e.g., PVDF), as another non-limiting example. The cathode 104 will further include a cathode current collector opposite the multimodal solid electrolyte 106, 206. The cathode current collector can include an aluminum or aluminum alloy, for example.

An example of a method of making the embodiments disclosed herein is provided and is illustrated in FIGS. 7A-7F. In FIG. 7A, the inorganic lithium ion conducting oxide material 300 to be used for the anode porous support is tape cast with pore former. The material 302 to be used for the first layer 110, 210 is selected and tape cast without pore former. The tape cast material 300 and material 302 are laminated together. In FIG. 7B, using a laser 304, the material 302 is etched to form either the continuous projections or the cones of the first layer 110, 210. Using the same technique, the material 310 for the porous cathode support is tape cast with pore former and the material 312 for the second layer 120, 220 is tape cast without pore former. The tape cast material 310 and material 312 are laminated together. The material 312 is etched using the laser 304 to form either the continuous projections or the cones of the second layer 120, 220. In FIG. 7C, the structures are sintered in air at about 1100° C. to convert the raw electrolyte tape to the solid sintered electrolyte first layer 110, 210 and second layer 120, 210 and to sublime the pore former in the material 300, 310, creating the porous anode support 320 and the porous cathode support 330 illustrated in FIG. 7C.

In FIG. 7D, a gel polymer electrolyte 314 is placed between the first layer 110, 210 and the second layer 120, 220 and the layers are placed under a load and heat (represented by the arrows) to form the structure 340 in FIG. 7E. The structure 340 is cured to convert the gel polymer electrolyte 314 to the solid polymer electrolyte layer 130 as illustrated in FIG. 7F.

Lithium metal is incorporated into the anode porous support 320 and an anode current collector is applied to create anode 102. The cathode active material is added to the porous cathode support and a cathode current collector is applied to create cathode 104.

Figure 8:
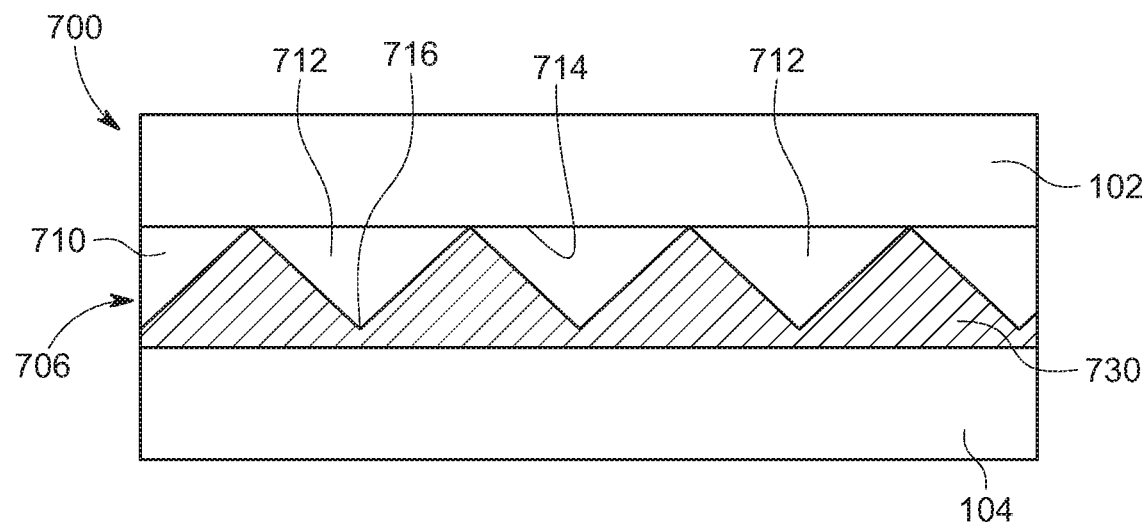
FIG. 8 is a cross-sectional view of an all solid-state electrochemical cell with another embodiment of a multi-modal solid electrolyte.

Other embodiments of the multimodal solid electrolyte are contemplated. FIG. 8 is a cross-sectional view of an embodiment 700 in which the multimodal solid electrolyte 706 has only a first layer 710 formed of rows 712, with each row 712 having a base 714 in contact with the anode 102 and having an apex 716 extending opposite the anode 102. The rows 712 can be either continuous projections or cones, as previously described. The remainder of the multimodal solid electrolyte 706 is a solid polymer electrolyte layer 730 between the first layer 710 and the cathode 104. Other aspects are as previously described.

Figure 9:
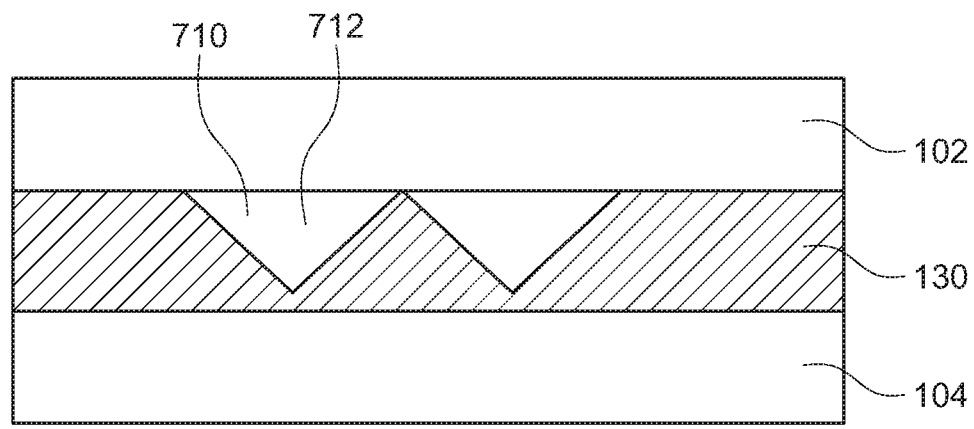
FIG. 9 is a cross-sectional view of an all solid-state electrochemical cell with another embodiment of a multi-modal solid electrolyte.

FIG. 9 is similar to FIG. 8, except that the first layer 710 is limited to only a portion of the electrolyte. A number of rows 712 are located centrally on the anode 102 and the remainder of the electrolyte is the solid polymer electrolyte layer 730. The number of rows is not defined, but the number is less than the number of rows necessary to cover the surface of the anode 102. Additionally, the rows 712 may each be of a length that is shorter than a length of the anode, so that there is a boarder of the solid polymer electrolyte layer 730 around the first layer 710.

Figure 10:
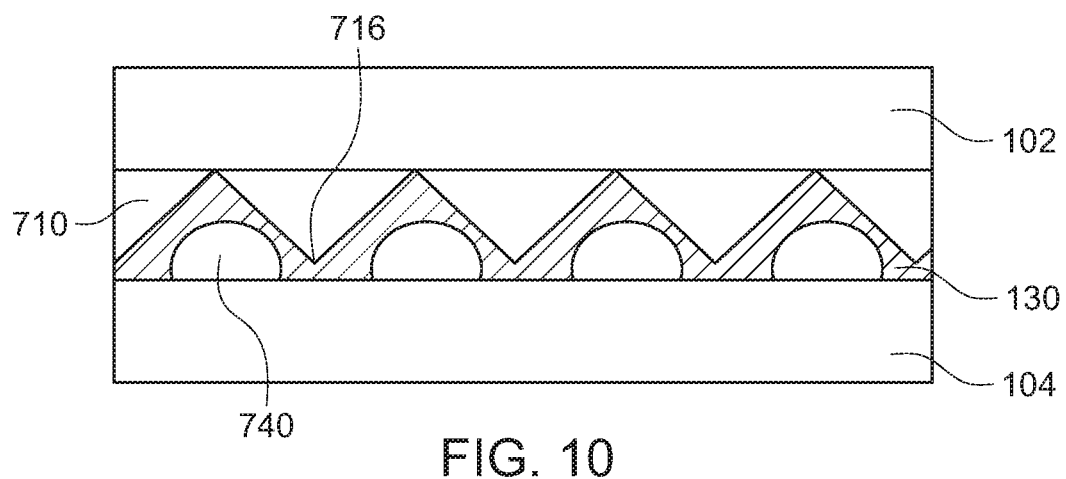
FIG. 10 is a cross-sectional view of an all solid-state electrochemical cell with another embodiment of a multi-modal solid electrolyte.

FIG. 10 is also similar to FIG. 8, except that there are islands 740 of an inorganic lithium ion conducting oxide material adjacent the cathode and extending between apexes 716 of the first layer 710. The islands 740 can be made with a 3D printer, for example. The shape shown is a non-limiting example. Other aspects are as previously described.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A solid-state lithium electrochemical device, comprising:
   an anode having a layer of anode active material;
   a cathode having a layer of cathode active material; and
   a planar multimodal electrolyte layer between the anode and the cathode and comprising:
      a first layer formed of first rows each having an anode-facing base with an apex extending opposite the anode, each anode-facing base in contact with adjacent anode-facing bases to form a continuous planar anode-facing surface of the planar multimodal electrolyte layer, the first layer being a first inorganic lithium conducting oxide material;
      a second layer formed of second rows each having a cathode-facing base with an apex extending opposite the cathode, the second layer being a second inorganic lithium conducting oxide material, wherein the second rows are offset from the first rows such that the apex of each second row nests within the first rows; and
      a solid polymer electrolyte layer sandwiched between the first layer and the second layer.

2. The solid-state lithium electrochemical device of claim 1, wherein the first inorganic lithium conducting oxide material and the second inorganic lithium conducting oxide material are individually one of $Li_{10}GeP_2S_{12}$, $Li_7La_3Zr_2O_{12}$ and $La_{0.5}.Li_{0.5}TiO_3$.

3. The solid-state lithium electrochemical device of claim 1, wherein the first inorganic lithium conducting oxide material is $Li_{10}GeP_2S_{12}$ and the second inorganic lithium conducting oxide material is one of $Li_7La_3Zr_2O_{12}$ and $La_{0.5}.Li_{0.5}TiO_3$.

4. The solid-state lithium electrochemical device of claim 1, wherein the first layer and the second layer are each greater than 98% dense.

5. The solid-state lithium electrochemical device of claim 1, wherein the solid polymer electrolyte layer has a thickness of between 0.1 μm and 100 μm and the multi-layer electrolyte has a thickness of between 10 μm and 500 μm.

6. The solid-state lithium electrochemical device of claim 1, wherein the first rows and the second rows are comprised of first cones and second cones, respectively.

7. The solid-state lithium electrochemical device of claim 6, wherein a diameter of each anode-facing base of the first cones and each cathode-facing base of the second cones is between 50 μm and 200 μm and a height of each of the first cones and the second cones is between 10 μm and 250 μm.

8. The solid-state lithium electrochemical device of claim 7, wherein a perimeter of each cathode-facing base is between 0 μm and 10 μm from an adjacent cathode-facing base.

9. The solid-state lithium electrochemical device of claim 1, wherein the first rows and the second rows are comprised of first continuous projections and second continuous projections, respectively.

10. The solid-state lithium electrochemical device of claim 9, wherein a width of each anode-facing base of the first continuous projections and each cathode-facing base of the second continuous projections is between 50 μm and 200 μm and a height of each of the first continuous projections and the second continuous projections is between 10 μm and 250 μm.

11. The solid-state lithium electrochemical device of claim 1, wherein:
the anode comprises a porous anode support within the anode active material; and
the cathode comprises a porous cathode support within the cathode active material.

12. The solid-state lithium electrochemical device of claim 11, wherein the porous anode support, the porous cathode support, the first inorganic lithium conducting oxide material and the second inorganic lithium conducting oxide material are individually one of $Li_{10}GeP_2S_{12}$, $Li_7La_3Zr_2O_{12}$ and $La_{0.5}.Li_{0.5}TiO_3$.

13. The solid-state lithium electrochemical device of claim 12, wherein the porous cathode support and the second inorganic lithium conducting oxide material are $La_{0.5}.Li_{0.5}TiO_3$ and the porous anode support and the first inorganic lithium conducting oxide material are $Li_{10}GeP_2S_{12}$.

14. The solid-state lithium electrochemical device of claim 11, wherein the first layer and the second layer are each greater than 98% dense and the porous anode support and the porous cathode support are between 30% and 60% porous.

15. A solid-state lithium electrochemical device, comprising:
an anode comprising a porous anode support on which anode active material is supported;
a cathode comprising a porous cathode support on which cathode active material is supported; and
a multimodal electrolyte comprising:
a first layer formed of first rows each having a base in contact with the anode with an apex extending opposite the anode;
a second layer formed of second rows each having a base in contact with the cathode and an apex extending opposite the cathode, wherein the second rows are offset from the first rows such that the apex of each second row nests within the first rows; and
a solid polymer electrolyte layer sandwiched between the first layer and the second layer, wherein the first layer and the second layer are each greater than 98% dense and the porous anode support and the porous cathode support are between 30% and 60% porous.

16. The solid-state lithium electrochemical device of claim 15, wherein the porous anode support, the porous cathode support, the first layer and the second layer are individually one of $Li_{10}GeP_2S_{12}$, $Li_7La_3Zr_2O_{12}$ and $La_{0.5}.Li_{0.5}TiO_3$.

17. The solid-state lithium electrochemical device of claim 15, wherein the solid polymer electrolyte layer has a thickness of between 0.1 μm and 100 μm and the multi-layer electrolyte has a thickness of between 10 μm and 500 μm.

18. The solid-state lithium electrochemical device of claim 15, wherein the first rows and the second rows are comprised of first cones and second cones, respectively, and a diameter of each base of the first cones and each base of the second cones is between 50 μm and 200 μm and a height of each of the first cones and the second cones is between 10 μm and 250 μm.

19. The solid-state lithium electrochemical device of claim 15, wherein the first rows and the second rows are comprised of first continuous projections and second continuous projections, respectively, and a width of each base of the first continuous projections and each base of the second continuous projections is between 50 μm and 200 μm and a height of each of the first continuous projections and the second continuous projections is between 10 μm and 250 μm.

20. A solid-state lithium electrochemical device, comprising:
an anode having a layer of anode active material on a porous anode support;
a cathode having a layer of cathode active material on a porous cathode support; and
a multimodal electrolyte between the anode and the cathode and comprising:
a first layer formed of first rows each having an anode-facing base with an apex extending opposite the anode, the first layer being a first inorganic lithium conducting oxide material;
a second layer formed of second rows each having a cathode-facing base with an apex extending opposite the cathode, the second layer being a second inorganic lithium conducting oxide material, wherein the second rows are offset from the first rows such that the apex of each second row nests within the first rows; and
a solid polymer electrolyte layer sandwiched between the first layer and the second layer,
wherein the porous anode support, the porous cathode support, the first inorganic lithium conducting oxide material and the second inorganic lithium conducting oxide material are individually one of $Li_{10}GeP_2S_{12}$, $Li_7La_3Zr_2O_{12}$ and $La_{0.5}Li_{0.5}TiO_3$.

* * * * *